United States Patent [19]

Kunin

[11] 4,071,446

[45] Jan. 31, 1978

[54] METHOD FOR REGENERATION OF WEAK ACID CATION EXCHANGE RESIN

[75] Inventor: Robert Kunin, Yardley, Pa.

[73] Assignee: Rohm and Haas Company, Philadelphia, Pa.

[21] Appl. No.: 698,459

[22] Filed: June 21, 1976

[51] Int. Cl.$^2$ .............................................. B01D 15/06
[52] U.S. Cl. ................................... 210/32; 260/2.2 R
[58] Field of Search ...................... 210/32; 260/2.2 R; 252/411 R, 412, 521

[56] References Cited

U.S. PATENT DOCUMENTS

| 3,454,503 | 7/1969 | Blankenhorn | 260/2.2 R |
| 3,629,144 | 12/1971 | Hahn | 252/412 |
| 3,882,018 | 5/1975 | Depree | 210/32 |
| 3,887,498 | 6/1975 | Kuhajek et al. | 210/32 |

FOREIGN PATENT DOCUMENTS

| 4,417,731 | 6/1975 | Japan | 210/32 |

*Primary Examiner*—Frank A. Spear, Jr.
*Assistant Examiner*—E. Rollins Cross
*Attorney, Agent, or Firm*—Louis F. Kline, Jr.

[57] ABSTRACT

A composition for regenerating weak acid cation exchange resin comprising about 70–80 weight percent alkali metal chloride, about 5–15 weight percent alkali metal carbonate, and the balance an alkali metal chelating polycarboxylate and a method of regeneration comprising contacting the resin with a solution of the composition are disclosed.

1 Claim, No Drawings

METHOD FOR REGENERATION OF WEAK ACID CATION EXCHANGE RESIN

BACKGROUND OF THE INVENTION

Description of the Prior Art

U.S. patent application Ser. No. 520,322, filed Nov. 4, 1974 discloses a novel water conditioning process involving, inter alia, regeneration of the water treatment ion exchange resin.

The regeneration systems disclosed therein are the two step acid/alkali technique, and a one step method involving a solution of alkali metal salts of citric or fumaric acid with up to 10% sodium hydroxide. Sodium polyphosphate and sodium hexametaphosphate are also disclosed as regenerants.

In a residential environment, sodium hydroxide systems cause serious safety problems. Furthermore, alkali metal citrates and fumarates are relatively expensive.

SUMMARY OF THE INVENTION

It is an object of the present invention to provide a one step regenerant composition which is safe for a residential environment and which is less expensive than prior one step regenerants.

A further object is to provide an improved one step method of regenerating weak acid cation exchange resin.

These objects and others as will become apparent from the following disclosure are achieved by the present invention which comprises in one aspect a composition comprising about 70-80 weight percent alkali metal chloride, about 5-15 weight percent alkali metal carbonate, and the balance alkali metal chelating carboxylate. In another aspect the invention comprises a method for regenerating weak acid cation exchange resin comprising contacting the resin with a solution of the above-mentioned composition.

DETAILED DESCRIPTION OF THE INVENTION AND THE PREFERRED EMBODIMENTS

The weak acid cation exchange resins to be regenerated are those which are generally useful for water conditioning. Especially suitable resins are those disclosed in Ser. No. 520,322, mentioned above.

The regenerant composition can be in solid or dissolved form, and can contain additional substances.

The alkali metals can be sodium or potassium, or mixtures thereof.

The compositions and methods of the invention achieve the objects of safety and cost-effectiveness as compared with prior art regenerants and regeneration. Sodium hydroxide is avoided by the process, resulting in increased safety. Substantially reduced sodium or potassium carbonate are needed, as compared to the closest prior regenerant, for equal regeneration efficiency.

A preferred method in accordance with the invention is to provide the composition in the form of pellets for use in currently available automatic home water treatment equipment. The pellets can be contained on a grid within the regenerant tank. Water can be added to the bottom of the tank so that the water only contacts the bottom layer of the pellets held on the grid. Water enters the bottom of the unit to a level approximately ¼ inches above the grid and is permitted to stand until regenerant is required. During this period a portion of the regenerant composition dissolves, and the liquid regenerant can be withdrawn automatically when regeneration is needed. After the liquid is withdrawn, water can be automatically introduced to the same level again. With this technique only a small portion of the pellets is contacted with liquid.

The method is also applicable to semi-automatic and manual residential units. By "residential" is meant units designed primarily for home use, but it is not meant to exclude the use of such units in non-home environments; rather the term is used to distinguish industrial units which are normally regenerated by the two step strong acid/strong base process, wherein the regenerant is handled by professionals.

The alkali metal carbonate is preferably sodium or potassium carbonate. The alkali metal chloride is preferably sodium or potassium chloride. The alkali metal chelating polycarboxylate is a compound derived from polycarboxylic acids; for example sodium citrate, potassium citrate, sodium fumarate, potassium fumarate, sodium nitroacetate, potassium nitroacetate, sodium carboxymethyloxysuccinate, sodium EDTA, potassium EDTA, sodium oxydiacetate, and the like.

The following example is presented to illustrate an embodiment of the invention, but it should be understood that the invention is not limited to this embodiment.

EXAMPLES 1A. (Comparative) — Resin I from Ser. No. 520,322 was a weak acid cation exchange resin based on methacrylic acid copolymerized with 4.5% divinyl benzene regenerated to a 70 percent level by a 4 percent solution containing 4 lbs. sodium citrate and 0.1 lb. sodium hydroxide per cubic foot of resin, introduced as a 4 percent solution. The average pH of treated water was 8.5, and softening capacity was 15 kg/ft.$^3$.

1B. (Invention) — Approximately equal regeneration was achieved by 8.5 lbs. of a composition comprising 80 weight percent sodium chloride, 15 weight percent sodium citrate, and 5 weight percent sodium carbonate. Thus, only 1.3 lbs. of the expensive sodium citrate was needed, compared with 4 lbs. in 1A., supra. The rate was 0.5 gpm/cu. ft., with resultant pH being 7.1-8.1, and capacity 14.6 kg/ft.$^3$.

1C. (Invention) — Substituting an equal amount of a regenerant composition having 75 weight percent NaCl, 15 weight percent sodium citrate, and 10 weight percent sodium carbonate, at the same rate, a pH of 7.9-9.5 and a capacity of 14.8 kg/ft.$^3$ was obtained.

1D. (Invention) — Repeating examples B and C using 70 weight percent NaCl, 15 weight percent sodium citrate, and 15 percent sodium carbonate, at the same rate, a pH of 8.1 and a capacity of 14.0 kg/ft.$^3$ was obtained.

2. Example 1C is repeated, except potassium fumarate is substituted for the sodium citrate, and good regeneration is obtained.

3. Example 1C is repeated except sodium EDTA is substituted for the sodium citrate, and good regeneration results are obtained.

I claim:

1. A process for regenerating a weak acid cation exchange resin comprising contacting the resin with a solution of 70 to 80 weight percent alkali metal chloride, about 5 to 15 percent alkali metal carbonate and the balance alkali metal chelating polycarboxylate.

* * * * *